United States Patent Office 3,396,217
Patented Aug. 6, 1968

3,396,217
METHOD OF FORMING AND FIRING
A CERAMIC MASS
Harley Banner Foster, 102 Elmwood Terrace,
Greensboro, N.C. 27408
No Drawing. Continuation-in-part of application Ser. No. 620,281, May 3, 1967, which is a continuation-in-part of application Ser. No. 413,360, Nov. 23, 1964, which is a continuation-in-part of application Ser. No. 213,114, July 30, 1962; said application Ser. No. 620,281 is also a continuation-in-part of application Ser. No. 490,080, Sept. 24, 1965. This application Oct. 25, 1967, Ser. No. 677,883
13 Claims. (Cl. 264—27)

ABSTRACT OF THE DISCLOSURE

A three component essentially ceramic body wherein one component is a granular non-plastic ceramic material composed of a refractory phase matter whose Pyrometric Cone Equivalent (PCE) is greater than a second binder phase component. The PCE of the binder phase material falls within the inclusive range of 021 to 08. A third component need not be ceramic but is of such particle size distribution and electrical character that it will carry electrical energy through the composite three component mixture. The three components are mixed with a liquid and the resulting wet mixture is cast into a mold. Loose insulating material, e.g. soil, the PCE of which is greater than the binder phase component may be distributed over the ware. Electrical current is then caused to flow through the composite ware mixture essentially following random conductive paths formed by the third component. As a result, a pyrochemical reaction takes place by converting the electrical energy into thermal energy by means of the inherent resistivity of the third component particles and thus achieving the PCE of the binder phase component.

The third component can be replaced with metal rods or mesh material permanently disposed in a mixture of refractory and binder phase component. Electrical current is then passed through these rods or mesh like material with the resulting conversion of electrical to thermal energy. Upon achieving the PCE of the binder phase component by this thermal energy, the composite unitary piece of ware including the rods or metal mesh is cooled and then put into its intended service.

Cross reference to related applications

This application is a continuation-in-part of my co-pending application Serial No. 620,281, filed May 3, 1967, which in turn is a continuation-in-part of my now-abandoned application Ser. No. 413,360, filed Nov. 23, 1964, which in turn is a continuation-in-part of my now-abandoned application Ser. No. 213,114, filed July 30, 1962. Patent application Ser. No. 620,281 identified above is also a continuation-in-part of my now-abandoned application Ser. No. 490,080, filed Sept. 24, 1965.

Summary of the invention

The method and composition of matter of this invention relates generally to a mode of forming and firing large essentially ceramic pieces of ware. These pieces of ware are in excess of 8″ x 4″ x 16″, e.g. 4′ x 8′ x 6″, and such pieces may be fired without the aid of a conventional kiln. In order to successfully fire such large ceramic pieces of ware and maintain dimensional stability, the ware must be so formulated that it is pyrochemically balanced to the point that upon drying and firing there is virtually no shrinkage observable in the final fired product.

By mixing a first major component of particulate non-plastic ceramic refractory material possessing a PCE greater than a particulate ceramic minor second binder phase component, when the binder phase component has a PCE that falls within the inclusive range of 021 to 08, there is observed after firing to the PCE of the binder phase material essentially no measurable shrinkage. Generally speaking, the refractory phase major component has a PCE of 01 or greater, preferably from cone 7 to cone 15. To a mixture of the first and second components, a third component is intermixed. This third component is termed an energy carrying portion and is not only in particulate form but is also adapted as to amount, particle size distribution, and electrical character that the composite three component mixture is one that has a multiplicity of electrical conducting paths. These paths are formed essentially of the third energy carrying component. In addition, the character of this third component is such that the granular material has enough inherent resistivity so as to be capable of converting, upon flowing electrical current therethrough, enough of this electrical energy into thermal energy so as to achieve the PCE of the binder phase component.

A wet castable mixture of the three components is made by the addition of any suitable liquid, e.g. water, and this castable mixture is then cast into a desired shape. Vibrational energy can be used to aid in the casting step. Electrical means are attached to the mold or the cast mixture in the mold. Loose particulate insulating material is disposed upon the ware and mold. This insulating material has a PCE above that of the binder phase material. Generally it is just soil. Subsequently, electrical current is caused to flow through the composite mass and a pyrochemical bonding takes place by conversion of the electrical energy to thermal energy. This thermal energy achieves the PCE of the binder phase component. After this bonding step, the loose particulate insulating material is removed so that the unitary ware may be recovered.

Metallic rods or metal mesh or grating can be used in place of the metal particles. Either metal rods, wire mesh, or a combination of both can be molded along with a mixture of the refractory and binder phase components. In essence, these would be like metal reinforcements otherwise used in casting concrete structures. After the ware has been cast, loose fill dirt or soil is disposed on top of the ware and mold. Electrical energy is converted into thermal energy by causing electrical current to pass through the metal means disposed inside of the cast ware. Enough electrical energy is converted to thermal energy so as to achieve the PCE of the binder phase component. Subsequently, the loose insulating particulate material is removed and the ware recovered from the mold. This ware has permanently disposed in it the metal means.

Detailed description of the invention

Workers in the structural clay industry have experienced great difficulty in producing fired ceramic ware that is larger in size than 8″ x 4″ x 16″. This is the size of an ordinary nominal concrete block. In some exception cases, sewer pipe is produced in a size larger than a concrete block. However, the shrinkage problems encountered in such manufacture are of considerable magnitude. Because of this shrinkage, dimensional stability is non-existent. Dimensional stability makes for a high ware recovery whereas low dimensional stability causes cracked ware and a low recovery rate.

Shrinkage in ceramic ware comes from two sources. The first source is drying shrinkage. The second is firing shrinkage. By-in-large, drying is less than the firing shrinkage. Drying shrinkage obviously comes from the removal of the water envelope that forms around each ceramic or clay particle. Firing shrinkage comes from the filling of the void space with a glass left by the water removal and particle packing of the ceramic particles. This glass is derived from the clay or ceramic particles themselves upon the application of thermal energy.

It has been proposed in U.S. Patent No. 3,199,992 to Moffitt to overcome the ceramic shrinkage problem by pyrochemically balancing a ceramic formulation. This balanced is achieved in part by providing refractory and binder phase components. These components are made up of harsh, gritty usually pre-fired particulate material. The binder phase component has a PCE of at least 8 cones less than the refractory phase and is made up of an expansible material. A mixture of the binder and refractory phase materials is achieved and a molded mass is fired to the PCE of the binder phase material. Measuring to the nearest 1/16 of an inch, no change in dimensions can be detected in ware formulated and fired in this manner.

The present invention follows generally the same thrust as that taught by Moffitt in that there is refractory phase and binder phase components made up of gritty, harsh, non-plastic materials. However, the binder phase component is not expansible in the accepted sense as disclosed by Moffitt. The refractory phase of the instant invention is made up of materials essentially the same as that of the Moffitt patent, and the disclosure of these refractory phase materials of Moffitt is incorporated herein by reference. To such materials, e.g. crushed brick bats, sewer pipe, fly ash, perlite, ceramic tile, igneous and metamorphic rock and the like, there is added a ceramic granular binder phase material. This binder phase material is generally either a man made frit, e.g. a low fusion glass, or a sodium borate. To this mixture there is added either one of two energy carrying third components. In a first embodiment, there is added metal particles. These particles can be any desirable metal but the most expedient ones are those that will perform satisfactorily with the least cost. Iron, aluminum, zinc, and copper particles can be added as this third component. The amount and particle size distribution of the metal particles is a function of the amount and particle size distribution of a mixture of the particulate refractory phase, binder phase and energy carrying components. This energy carrying component amount and particle size distribution is such that there is formed throughout the mixture of all components random paths through which electrical energy can be transmitted. The energy carrying particles also have an electrical resistance the degree being such that electrical energy is converted to thermal energy while electrical current is passing through the composite body of refractory, binder and energy carrying components. Conversion of electrical energy to thermal energy is carried on until the PCE of the binder phase material is achieved.

In a second embodiment, the energy carrying particles are replaced with metal means such as rods or wire like mesh. These rods or mesh can be used singularly or in combination with each other. They are disposed in a mold much like the reinforcement rods or wire mesh commonly used in casting concrete and subsequently a mixture of ceramic refractory phase component and binder phase component is cast into space left vacant by the metal means. These metal means are unitary and continuous and extend throughout the cast ware. After casting, electrical current is passed through the metal means. Conversion of electrical energy to thermal energy is achieved from the inherent resistance of the metal means. This conversion to thermal energy is continued until the PCE of the binder phase component is achieved. After cooling, the final ware has permanently embedded therein the metal means.

Thus, it is seen that there has been disclosed a method and a composition of matter that will achieve a molding and firing of ceramic ware that is dimensionally stable. Measuring to the nearest 1/16 of an inch, there can be detected no shrinkage, either drying or firing. This is especially true when the PCE of the binder phase material falls within the inclusive range of 021 to 08 and the refractory phase component has a PCE of at least cone 7. The inherent advantage of this method is that panels of ceramic ware, e.g. 4' x 8' x 6" can be made on a custom basis without the aid of a kiln especially designed for this purpose and size. For example, a brick manufacturer who has a surplus of broken bricks can grind and then, mix with the ground bricks a frit and powdered metal and mold the material into a desired shape and fire this shape without the aid of a kiln. In short, the "kiln" in which the ware is fired is made on the spot. That is, the three component mixture is cast into a mold, electrical connections are made, and the ware and mold are covered with loose insulating material and fired this way. For most purposes, this material can be soil. In some cases, it can be ground particulate material of the refractory phase component. For some purposes, air could be forced through the loose particulate material and caused to flow over the cast material in the mold. In this manner, any desired atmosphere, e.g. an oxidizing one could be achieved. By the same token, a neutral or reducing gas could be forced through the loose particulate material to achieve a desired atmosphere. By merely disposing a pipe with a gas discharge open end in the loose material and causing gas to flow through the pipe towards the discharge end a desired atmosphere can be achieved.

Examples of materials that can be used for the refractory phase component are: naturally occurring (unweathered) greenstone, arkose, ryolite, siltstone, brick grog, e.g. crushed brick, sewer pipe, drain tile, bath tile, perlite and fly ash. Examples of the binder phase material that can be used in this invention are: man-made frits, and particulate sodium borate. Energy carrying materials can be either iron, zinc, copper or aluminum particles, rods or wire mesh. Generally speaking, the refractory component is ground to the point where essentially 100% passes through a Tyler Standard 14 mesh. A sieve analysis typical of the particle size distribution used is set forth below:

TABLE I

| Tyler standard mesh: | Percent retained |
|---|---|
| 14 | 0 |
| 20 | 17.2 |
| 35 | 23.0 |
| 48 | 2.0 |
| 65 | 12.5 |
| Pan | 45.3 |

TABLE II

| Frit No. | Melting Point °F. | $K_2O$ | $Na_2O$ | CaO | SrO | $B_2O_3$ | $Al_2O_3$ | $SiO_2$ |
|---|---|---|---|---|---|---|---|---|
| P926 | 1,500 | 0.01 | 0.31 | 0.68 | | 0.61 | 0.11 | 1.90 |
| P830 | 1,500 | | 0.65 | 0.35 | | 0.84 | | 2.54 |
| P786 | 1,800 | 0.09 | 0.09 | 0.58 | 0.24 | 0.36 | 0.19 | 2.80 |

Typical man made frits are those customarily purchased from commercial frit supply sources. Oxide analysis of typical frits that can be used in this invention purchased from Pemco Corporation of Baltimore, Md. are as follows:

These frits can be obtained in a particle size that is essentially —100 mesh Tyler Standard. This particular particle size can be used as well as grinds lower in particle size, e.g. —160 and —200 mesh Tyler Standard.

The particle size distribution of the energy carrying particulate metal is a function of the amount used and the amount and particle size distribution of other components, i.e. refractory and binder phase materials. As a general rule, the smaller the particle size of the metal particles the more surface area of metal achieved. However, as a general guide as to how much and what particle size distribution one can employ it can be stated that any particle size and distribution can be used so long as the amount used is sufficient to achieve a plurality of current carrying paths throughout the composite three component mixture. As a matter of practice, a particle size distribution of at least —14 mesh is desirable. Finer grinds can also be used to suit the desired resulting appearance of the fired article especially —100 mesh and lower. Upon firing or exposure to thermal energy, the metal particles obviously oxidize when they come into contact with oxygen. This oxidation changes the color of the metal. For example, aluminum changes from the metallic color to alumina which has a white color. Iron oxidizes to a brick red color and etc.

A typical batch mixture is set forth below that may be used to carry out the instant invention:

Typical three component mixture

Refractory phase component.—100 parts by weight; essentially —14 mesh Tyler Standard, crushed brick bats; PCE no less than 7 or more than 16.

Binder phase component.—10 to 20 parts by weight of frit; essentially —100 mesh Tyler Standard; composition P926 (see Table II above); melting point 1500 degrees F. (PCE 016).

Energy carrying component [1].—3–29 parts by weight; aluminum particles —65 mesh Tyler Standard.

Liquid for casting.—Water.

Type of mold.—Metallic or paper mold.

Fired ware resulting from the molding and firing of the composition as disclosed above exhibits distinct refractory particulate matter bonded together with a glassy matrix. Also bonded with the glassy matrix in a random manner are metallic particles either wholly or partly oxidized. When rods, wire mesh or both are used in place of the energy carrying particulate matter, the rods or wire mesh are permanently bonded inside of the ware and their surfaces are oxidized either wholly or in part.

It will be appreciated that the terminal connections for electrically connecting a power source to the electrical conductive component in the mixture (i.e., the energy carrying component mentioned in the above example) may be of any suitable construction and configuration. For example, terminal plates or the like may be clamped to opposite sides or ends of the mixture to complete circuit continuity. If a metallic mold is used, it may be connected directly to a terminal of the power source.

It also will be appreciated that the three component mixture may be fired in situ. For example, a wall of building may be formed by providing a mold by casting the aforesaid mixture into the mold, and by applying electrical current from an available source such as a nearby power line.

The invention may be embodied in other specific forms without departing from the spirit or esesntial characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a method of forming and firing a ceramic mass, the steps comprising:

[1] As set forth previously, rods or wire like mesh can be used or a combination of both much like after the practice of casting a cementitious concrete mass. Obviously, vibrational energy can be used as an aid to any casting procedure whether using rods, wire mesh or particles as energy carrying means.

(a) providing a mixture of particulate, nonplastic matter composed essentially of a first component, a second component, and a third component, said first component being a refractory phase ceramic particulate material whose Pyrometric Cone Equivalent is greater than said second component, said second component being a ceramic binder phase particulate material whose Pyrometric Cone Equivalent falls within the inclusive range of 021 to 08, and said third component being a metallic material arranged to form a series of electrical energy carrying paths through said mixture, said third component having an inherent electrical resistivity for converting electrical energy into thermal energy;

(b) forming said mixture of step (a) into a desired shape; and (c) pyrochemically bonding the formed mixture of step (b) into a unitary piece of ceramic ware by passing electrical energy substantially through said third component and converting said electrical energy into enough thermal energy to achieve the Pyrometric Cone Equivalent of said second component.

2. The method defined in claim 1 wherein said third component is composed of metal particles which convert substantially to an oxide form upon reaction with surrounding oxygen at a time and temperature no less than just above the Pyrometric Cone Equivalent of said second component.

3. The method defined in claim 1 wherein a fluid medium is added to the mixture of step (a) to form a castable mass.

4. The method defined in claim 1 wherein vibrational energy is applied to said mixture during forming.

5. The method defined in claim 1 wherein after forming said mixture, the thusly formed ware is covered with particulate insulating material, the Pyrometric Cone Equivalent of which is greater than that of said second component, and wherein, after the firing step, said insulating material is removed.

6. The method defined in claim 1 wherein said third component is a particulate material dispersed throughout said mixture.

7. The method defined in claim 1 wherein said third component is a mesh embedded in the formed mixture.

8. The method defined in claim 1 wherein said third component comprises a series of rods embedded in the formed mixture.

9. The method defined in claim 5 comprising the step of causing a gaseous medium to flow through said loose insulating material during firing.

10. In a method of forming and firing a ceramic mass, the steps comprising:

(a) providing a mixture of particulate, non-plastic matter composed essentially of a first component, a second component, and a third component, said first component being a refractory phase ceramic particulate material whose Pyrometric Cone Equivalent is greater than said second component, said second component being a ceramic binder phase particulate material whose Pyrometric Cone Equivalent falls within the inclusive range of 021 to 08, and said third component being a metallic particulate material in an amount, character and particle size distribution sufficient to form a series of electrical energy carrying paths through said mixture, said third component having an inherent electrical resistivity for converting electrical energy into thermal energy;

(b) forming the mixture of step (a) into a castable mass by adding a fluid thereto;

(c) casting the mixture of step (b) to a desired shape employing vibrational energy as a casting aid;

(d) pyrochemically bonding the mixture formed by step (c) by first covering the cast mixture with loose insulating particulate material whose Pyrometric Cone Equivalent is at least greater than that of the binder phase material and then passing electrical energy substantially through paths formed by said third component and converting said electrical energy into enough thermal energy to achieve the Pyrometric Cone Equivalent of the binder phase material; and (e) removing said insulating material and recovering the fired ware.

11. In a method of making pyrochemically bonded ceramic structural ware, the steps comprising:

(a) providing a mixture of perlite, water, and a granular ceramic binder phase material whose Pyrometric Cone Equivalent falls within the inclusive range of 022 to 07;

(b) forming said mixture into a piece of unitary green ware; and subsequently (c) firing the thusly formed ware to the Pyrometric Cone Equivalent of the ceramic binder phase material.

12. The method defined in claim 11 wherein said mixture consists essentially of said perlite, said water, and said ceramic binder phase material.

13. The method defined in claim 12 wherein said ceramic binder phase material is selected from the group consisting essentially of ceramic frits and naturally occurring sodium borates.

References Cited

UNITED STATES PATENTS

| | | | |
|---|---|---|---|
| 1,650,080 | 11/1937 | Lefebure | 106—84 |
| 3,354,245 | 11/1967 | Foster | 264—60 |
| 1,929,425 | 10/1933 | Herman. | |
| 1,707,395 | 4/1929 | Hyde | 106—40 |
| 2,656,281 | 10/1953 | Wasserman | 106—84 |
| 2,805,448 | 9/1957 | Rubenstein. | |
| 2,877,125 | 3/1959 | Duplin | 106—67 |
| 2,949,704 | 8/1960 | Jacobs. | |
| 2,576,565 | 11/1951 | Brown. | |
| 1,924,648 | 8/1933 | Merriam | 264—27 |
| 3,274,304 | 9/1966 | Horgon et al. | 264—27 |
| 3,333,033 | 7/1967 | Merz | 264—27 |

OTHER REFERENCES

A Literature Review of the Utilization of Fly Ash, Littlejohn, 1954, all pages.

ROBERT F. WHITE, *Primary Examiner.*

T. J. CARVIS, *Assistant Examiner.*